United States Patent [19]

Vachss et al.

[11] Patent Number: 5,191,448
[45] Date of Patent: Mar. 2, 1993

[54] PHOTOREFRACTIVE SQUARE LAW CONVERTER

[75] Inventors: Frederick R. Vachss, Thousand Oaks; John H. Hong, Moorpark, both of Calif.

[73] Assignee: Rockwell International Corporation, Seal Beach, Calif.

[21] Appl. No.: 780,595

[22] Filed: Oct. 23, 1991

[51] Int. Cl.$^5$ .......................... G03H 1/02; G02F 1/00; G02B 26/00

[52] U.S. Cl. .......................................... 359/7; 359/1; 359/28; 359/30; 359/244; 359/290; 359/292; 359/322

[58] Field of Search ...................... 359/1, 7, 10, 11, 28, 359/30, 35, 197, 204, 244, 290, 292, 293, 299, 322

[56] References Cited

U.S. PATENT DOCUMENTS 4,429,954  2/1984  Caulfield et al. .................. 350/3.64
5,062,693  11/1991  Beratan et al. .......................... 359/11

Primary Examiner—Bruce Y. Arnold
Assistant Examiner—David R. Parsons
Attorney, Agent, or Firm—John C. McFarren

[57] ABSTRACT

A photorefractive device is provided for converting an image-bearing incoherent input beam to a high contrast coherent output beam the intensity of which varies as the square of the input intensity pattern. The device uses an incoherent image beam to write a holographic grating directly in a photorefractive medium. In one embodiment, a parallel, laterally displaced, telecentric system of lenses is used to split a quasi-monochromatic, incoherent image-bearing beam into two equal components. The two components are superimposed at the surface of the photorefractive medium to produce the hologram. In a second embodiment, the incoherent input beam is directed through a physically translating external grating to write the hologram in the photorefractive medium. The moving grating improves the diffraction efficiency of the hologram under the influence of an applied electric field and stabilizes the temporal response characteristics for signal processing. In both embodiments, the photorefractive medium is exposed to a coherent beam that picks up the image from the hologram and produces a coherent output beam having a high contrast replica of the input image.

20 Claims, 1 Drawing Sheet

PHOTOREFRACTIVE SQUARE LAW CONVERTER

GOVERNMENT RIGHTS

The United States Government has rights in this invention under contract number F30602-89-C-0181 awarded by the Department of the Air Force.

TECHNICAL FIELD

The present invention relates to spatial light modulators and, in particular, to a high contrast, high resolution, optically addressed, photorefractive spatial light modulator for converting an incoherent input to a coherent output.

BACKGROUND OF THE INVENTION

Optically addressed spatial light modulators (SLMs) are devices having a local response to some incoherent incident optical beam that can be used to control the behavior of a second, generally coherent, optical beam. Because of this function, optically addressed SLMs are becoming increasingly important as input/output devices in sophisticated optical signal processing and computing systems.

A common feature of many optical signal processing systems is the need for a high performance optically addressed SLM to perform parallel temporal integration on an array of optical signals. Although a variety of different SLMs have been used in such systems, SLMs based on photorefractive holography are particularly promising in applications requiring high resolution, sensitivity, and dynamic range. Photorefractive holography, however, usually involves the creation of a periodic intensity grating produced by interference of a coherent input beam with a coherent reference beam within the holographic medium. This process must be modified if incoherent input beams are to be used to create the holograms.

The Photorefractive Incoherent-to-Coherent Optical Converter (PICOC), which is well known in the art, uses coherent plane wave beams to write and read out a photorefractive hologram. The input image is provided in a separate beam that locally erases the photorefractive grating. The image beam may be incoherent because it does not interfere with the coherent writing and reading beams. The process spatially modulates the diffracted output depending on the local intensity of the erasing beam. However, the PICOC must be operated in the weak signal regime since strong input signals, with intensities near those of the writing and reading beams, give rise to saturation of the output response. As a result, the PICOC represents input signals as a weak modulation of a strong output beam, and the output tends to be low in contrast. Although the ability to receive and process incoherent input images is desirable, most optical image processing systems function best receiving the high contrast associated with coherent light holography. Thus, there is a need for an improved, optically addressed SLM that achieves high resolution and sensitivity with incoherent, information-bearing light inputs.

SUMMARY OF THE INVENTION

The present invention comprises a photorefractive device that converts an image from an incoherent input beam to a high contrast coherent output beam. The device uses a single, information-bearing, incoherent beam to write a holographic grating directly in a photorefractive medium. For weak image input beams, the intensity of the output varies as the square of the input intensity pattern.

In one embodiment of the invention, a system of paralle, laterally displaced, telecentric lenses is used to split an incoherent, but quasi-monochromatic, image-bearing input beam into two equal components. The two components of the image beam are directed by the lens system to overlap precisely on the surface of a photorefractive medium. As a result of the photorefractive effect, the superposition of the two equal quasi-monochromatic image components produces a holographic grating in the photorefractive material. The photorefractive material is exposed simultaneously to a brighter coherent beam that picks up the image from the holographic grating and produces a coherent output beam having a high contrast replica of the input image.

In a second embodiment of the invention, the incoherent image input beam is directed through a physically translating external grating to write the holographic grating in the photorefractive medium. The diffraction efficiency of the photorefractive hologram under the influence of an applied electric field is increased when the intensity pattern in the photorefractive medium is moved at the appropriate velocity. The moving grating also stabilizes the temporal response characteristics and restores the smooth exponential damping required for signal processing.

A principal object of the invention is the production of a high contrast, high resolution, low harmonic distortion, optically addressed spatial light modulator. A feature of the invention is a parallel, laterally displaced, telecentric lens system, or a physically translating external grating, to write a holographic grating in a photorefractive medium using an incoherent input image beam. An advantage of the invention is the conversion of a weak, incoherent input image beam into a high contrast, coherent output beam having an intensity pattern proportional to the square of the input intensity pattern.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

The present invention comprises a high contrast, high resolution, optically addressed spatial light modulator (SLM). The invention uses a form of photorefractive holography to obtain the high resolution usually associated with volume holographic gratings. Normally, holographic gratings are written in photorefractive media by the interference of coherent light beams. The present invention, however, comprises means for writing a holographic grating directly in a photorefractive crystal using a single incoherent image-bearing light beam.

An incoherent, but monochromatic, image-bearing light beam can be split into two equal components with a beam splitter and redirected with mirrors to overlap precisely at a specified angle at the surface of a photorefractive medium. The two components of the beam write a holographic grating in the medium due to the photorefractive effect. If the photorefractive medium is exposed simultaneously to a coherent beam, brighter than the image-bearing beam, an output beam will be generated with a coherent replica of the input image.

Figure 1:
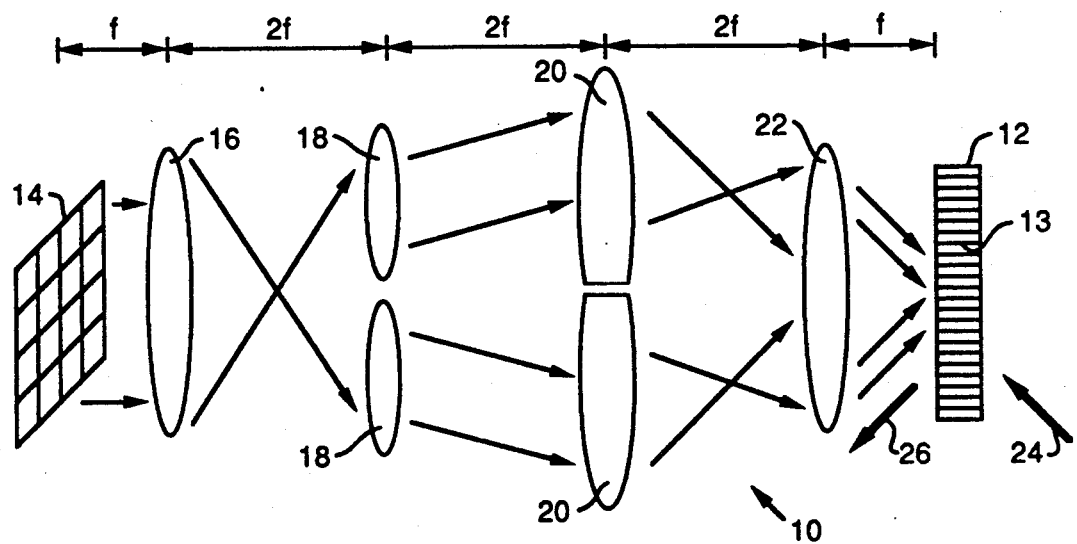
FIG. 1 is a schematic diagram of a first embodiment of the present invention incorporating a parallel, laterally displaced, telecentric imaging system.

In actual practice, however, the precise registration required for the two components of the incoherent image-bearing beam presents formidable alignment problems in writing holographic gratings. These alignment problems are circumvented by an embodiment of the present invention shown schematically in FIG. 1. FIG. 1 illustrates a photorefractive square law converter 10 that comprises a photorefractive crystal 12, such as a 1 cm$^2 \times$ 2 mm crystal of BaTiO$_3$, SBN, GaAs, or Bi$_{12}$SiO$_{20}$, for example, in combination with a telecentric imaging system. Incoherent, quasi-monochromatic light from an image field 14 is focused by a lens (or system of lenses) 16 positioned a distance of one focal length (f) from image field 14. The light from lens 16 is focused on a pair of laterally displaced, telecentric lenses 18 positioned a distance of two focal lengths (2f) from lens 16. Lenses 18 focus two parallel replicas of image 12 on a second pair of laterally displaced, telecentric lenses 20, positioned a distance of 2f from lenses 18. The optical axes of lenses 20 are aligned with those of lenses 18, but lenses 20 are larger in diameter than lenses 18 to preserve the field of view of converter 10. Lenses 20 focus the parallel images on a collimating lens (or system of lenses) 22 positioned a distance of 2f from lenses 20. Lens 22 directs the superimposed images onto photorefractive crystal 12 to write a holographic grating as a result of the photorefractive effect.

In photorefractive converter 10, any point source in image field 14 results in a point image in crystal 12. Thus, converter 10 does not require any spatial coherence on the part of input image 14. Similarly, the telecentric imaging system of converter 10 ensures a common transit time along the parallel optical paths, thus avoiding the strong temporal coherence requirements in conventional interferometric systems. Because the spacing of the grating written in crystal 12 is dependent on the wavelength of light in the imaging system, quasimonochromatic light must be used. In particular, the fractional bandwidth of the illumination in converter 10 must be less than 1/N, where N is the number of grating fringes present in photorefractive crystal 12.

When holographic grating 13 is written in photorefractive crystal 12, crystal 12 is exposed simultaneously to a read beam 24 of coherent light having a greater intensity than the image-bearing light. Interaction of read beam 24 with hologram 13 written in crystal 12 produces an output beam 26 that comprises a coherent replica of image field 14.

Because the technique of converter 10 involves an overlap of two images, the angle between the two image-bearing beams cannot be so large that registration between the images shifts by more than one pixel (i.e., the minimum resolution scale of the image) in the depth of photorefractive crystal 12. This condition may be expressed more explicitly as:

$$a > d \cdot \theta / 2,$$

where a is the pixel size, d is the thickness of the medium, and $\theta \approx \Delta/f$ is the inter-beam angle, where $\Delta$ is the displacement between the two beam paths and f is the focal length of the lenses. A second resolution constraint results from the holographic nature of the readout process. If a reasonably uniform response is to be obtained for images of varying scales, the pixel size must exceed the spatial period of the amplitude grating we have introduced. This requirement can be formally stated as:

$$a > \lambda/\theta,$$

where $\lambda$ is the wavelength of the read-out beam. Combining the two previous equations, it can be seen that the pixel size a is minimized when $\theta$ is chosen so that these two conditions are equivalent. Substituting the resulting value of $\theta$ into either of these expressions yields $$a > (\lambda \cdot d/2)^{\frac{1}{2}}$$

as an expression of the ultimate resolution constraint for converter 10. This is the same diffraction limited resolution as that obtained for the PICOC device described above.

If wideband illumination (rather than quasi-monochromatic) is required, another technique for writing a hologram with a single incoherent beam is to superimpose an external, sinusoidal amplitude grating on the image-bearing beam. The external grating has a transmittance of the form:

$$T(x,y) = 1 + c \cdot \sin(k_G x),$$

for some real constant $c < 1$, where $k_G = (4\pi/\lambda) \sin(\theta/2)$ is the grating spatial frequency and $\lambda$ is the wavelength of the incident light. If the image has an intensity distribution I(x,y), the intensity pattern incident on the photorefractive medium will be the product I(x,y) $\times$ T(x,y). This, however, is precisely the distribution one would obtain if two identical replicas of the image were interfered coherently in the photorefractive medium. Thus, this technique is a method of simulating two-image interference without requiring the strict alignment needed to superimpose two versions of the image.

Use of an external grating to write a hologram with an incoherent input yields a coherent output intensity proportional to the square of the input intensity and to the diffraction efficiency of the photorefractive medium. When the input intensity is low, the output becomes exceedingly weak unless the diffraction efficiency is high. This low output signal strength limits the effective dynamic range of this technique. One method of improving the output signal strength is to use photorefractive materials, such as BaTiO$_3$ and SBN, that have intrinsically high efficiency. Use of these materials will improve the dynamic range at the cost of providing very slow temporal response, which is unacceptable for real-time applications.

Faster photorefractive materials, such as Bi$_{12}$SiO$_{20}$ and GaAs, may have their efficiencies increased by application of large DC electric fields transverse to the direction of optical propagation. Efficiency improvement is modest, however, and the electric field alters the nature of the temporal response of the photorefractive medium. In particular, the normal smoothly damped exponential behavior of a photorefractive crystal becomes oscillatory and underdamped when influenced by large electric fields. This underdamped response introduces temporal phase shifts between the input and output, which results in unstable behavior when the SLM is used in closed loop signal processing systems.

Figure 2:
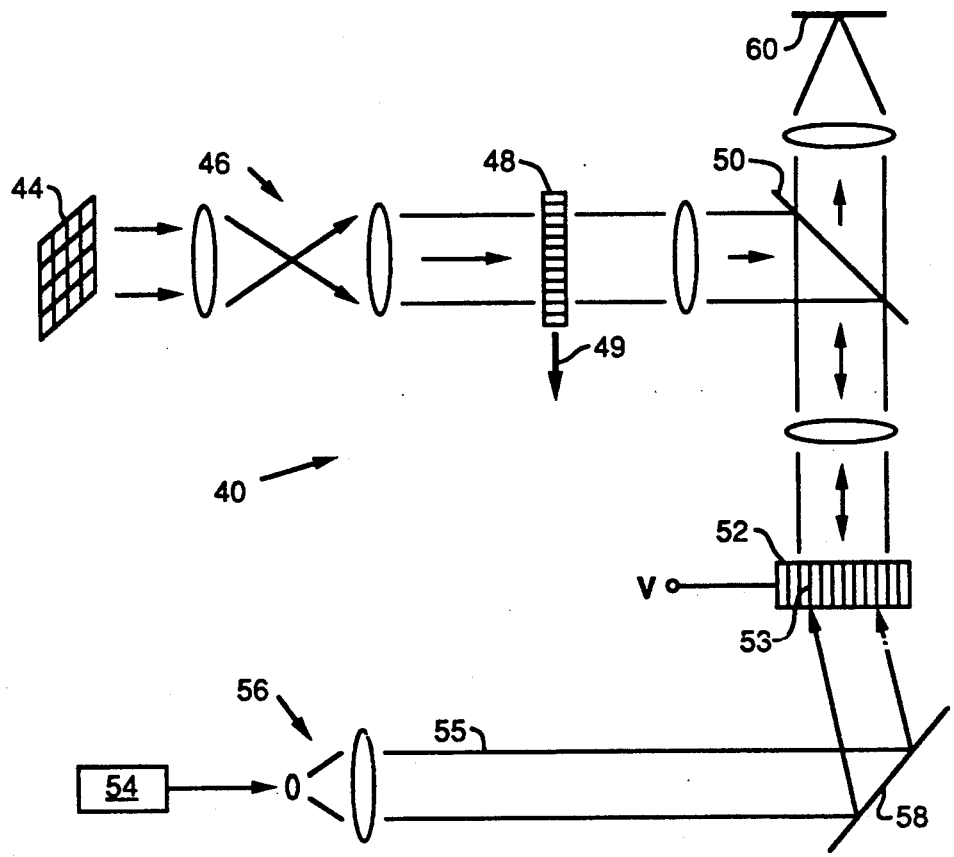
FIG. 2 is a schematic diagram of a second embodiment of the present invention incorporating a physically translating external grating.

The embodiment of the present invention illustrated schematically in FIG. 2 overcomes the foregoing deficiencies. Photorefractive square law converter 40 converts incoherent light from an image field 44 into a coherent light output. Image-bearing incoherent light from field 44 is projected through a lens system 46 and a physically translating external grating 48. External grating 48 translates in a direction indicated by vector arrow 49. Light passing through grating 48 is directed by a beamsplitter 50 into a photorefractive crystal 52. Input image 44 and grating 48 are held in two separate planes so that grating 48 may be translated while image field 44 remains fixed. One-to-one imaging optics from grating 48 to photorefractive crystal 52 ensure that any motion of external grating 48 is equivalent to the motion of the intensity pattern of hologram 53 written in crystal 52. A source of coherent light 54, such as an argon laser, for example, projects a coherent light beam 55 through a lens system 56 and a mirror 58 into photorefractive crystal 52. Coherent beam 55 picks up a replica of image 44 from hologram 53. The coherent beam with image replica can be directed through beamsplitter 50 and projected on an output plane 60. The output at plane 60 comprises a coherent replica of image 44 having an output intensity pattern proportional to the square of the incoherent input intensity pattern.

As an alternative to a translating grating, image 44 and grating 48 may remain fixed while photorefractive crystal 52 is translated. This approach has the disadvantage of representing a single pixel at a varying location in the crystal, thus producing additional output noise due to spatial non-uniformity of the diffraction efficiency of the photorefractive medium. By choosing to translate only the external grating, the fixed spatial relation between input image 14 and crystal 12 is preserved, thus reducing sensitivity of the system to mechanical fluctuations introduced by the translation apparatus.

Translating external grating 48 causes hologram 53 to have a moving intensity pattern. If the intensity pattern of hologram 53 moves at an appropriate velocity, the diffraction efficiency of hologram 53 under an applied electric field is increased. It has also been determined that if the intensity pattern of hologram 53 is moved at a second velocity, the smooth exponential damping characteristic necessary for signal processing can be restored. Furthermore, it has been discovered that these two velocities are sufficiently close that significant improvements in diffraction efficiency can be achieved at the same time the temporal response characteristics are stabilized.

The direction and speed at which grating 48 must move (i.e., its velocity vector 49) is determined by the response time of photorefractive medium 52, the strength and polarity of the applied electric field, and the period of external grating 48. For typical applied field strengths on the order of V=5 kV/cm in $Bi_{12}SiO_{20}$, optimal results have been achieved when grating 48 is translated by 0.1 to 0.2 periods per response time. The response time varies inversely with the intensity of the incident light and is approximately 0.5 seconds when the incident intensity is about 1.0 mW/cm$^2$. The choice of external grating period ($\Lambda$) is governed by the thickness of photorefractive medium 52. It has been determined that optimal resolution can be obtained for a grating period $\Lambda \approx (\lambda L)^{\frac{1}{2}}$, where L is the thickness of crystal 52 and $\lambda$ is the wavelength of the incident light. Given these conditions, a typical crystal thickness of 1 mm to 1 cm gives rise to optimal grating periods of about 20 to 70 $\mu$m, which in turn results in optimal grating velocities of approximately 2 to 20 $\mu$m/sec. These grating speeds are easily obtainable using commercially available DC or stepper motor driven translation systems. Using a DC motor driven system in the configuration shown in FIG. 2, a smooth exponential response was achieved with a grating velocity of about 7 $\mu$m/sec. and an applied electric field of 5 kV/cm in a 2 mm thick crystal of $Bi_{12}SiO_{20}$. This produced a tenfold improvement in diffraction efficiency over a corresponding system having a stationary external grating.

The significant advantage of the holographic grating writing techniques of the present invention over known methods, such as the PICOC process, is the intrinsically higher contrast that is achieved. In the PICOC process, an output beam is present regardless of the strength of the incoherent input beam, and the effect of the input beam is simply a weak modulation of the intensity of the output beam. In the present invention, however, the output beam vanishes in the absence of an input beam because the incoherent input beam actually writes the hologram in the photorefractive medium. Thus, even for low input intensities, a high contrast coherent output image is produced.

As stated above, the present invention provides an incoherent-to-coherent converter having a coherent output intensity proportional to the square of the incoherent input intensity pattern. The inherent square law response is useful in certain signal processing applications that require conversion of amplitude to intensity information. In addition, this non-linear response provides an automatic increase in contrast in binary image SLM applications.

In situations where a linear input/output intensity relation is desired, the input image may be added to a constant background bias intensity. The output will then contain a component directly proportional to the input signal, as well as a smaller second harmonic non-linear term. Although this biased mode of operation introduces an undesirable non-linear component into the output as does the PICOC, the level of this harmonic distortion is significantly lower with the present invention. Furthermore, the second harmonic distortion is the sole form of non-linearity suffered by the present invention, whereas the PICOC produces a full spectrum of higher harmonic non-linear distortion components. The lower harmonic distortion produced by the present invention is particularly significant in optical signal processing applications.

As a result of the reduced non-linearity exhibited by the techniques of the present invention, the bias levels required for quasi-linear operation are commensurately lower than those required in the PICOC. This implies that the present invention may be operated over a broader range of input signal and read-out intensities. The present invention, in either of the described embodiments, exhibits both a higher dynamic range and a broader intensity-dependent speed range than competing photorefractive SLM devices.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

We claim:

1. A photorefractive spatial light modulator, comprising:
   means for receiving an input beam comprising incoherent light bearing an image;
   means for separating said input beam into two components, each of said components comprising incoherent light bearing said image;
   means for superimposing said two components in a photorefractive medium to generate a holographic grating;
   means for receiving a read beam of coherent light directed into said holographic grating; and
   said photorefractive medium producing an output beam of coherent light bearing said image, said output beam generated by interaction of said read beam with said grating.

2. The photorefractive spatial light modulator of claim 1, wherein said means for separating said input beam comprises a system of parallel, laterally displaced, telecentric lenses.

3. The photorefractive spatial light modulator of claim 2, wherein said output beam comprises an intensity pattern proportional to the square of an intensity pattern of said input beam.

4. The photorefractive spatial light modulator of claim 3, wherein said input beam comprises quasi-monochromatic light.

5. The photorefractive spatial light modulator of claim 4, wherein said photorefractive medium comprises a crystal of material selected from the group of photorefractive materials consisting of $BaTiO_3$, SBN, GaAs, and $Bi_{12}SiO_{20}$.

6. A method of converting an image from an incoherent input beam to a coherent output beam, comprising the steps of:
   providing an input beam comprising incoherent light bearing the image;
   separating said input beam into two components, each of said components comprising incoherent light bearing the image;
   superimposing said two components in a photorefractive medium to generate a holographic grating;
   directing a read beam of coherent light into said holographic grating; and
   producing an output beam of coherent light bearing the image, said output beam generated by interaction of said read beam with said grating.

7. The method of claim 6, wherein the step of separating said input beam comprises providing a system of parallel, laterally displaced, telecentric lenses.

8. The method of claim 7, wherein the step of producing said output beam comprises producing said output beam with an intensity pattern proportional to the square of an intensity pattern of said input beam.

9. The method of claim 8, wherein the step of providing said input beam comprises providing quasi-monochromatic light.

10. The method of claim 9, wherein the step of superimposing said two components comprises superimposing said two components in a crystal of material selected from the group of photorefractive materials consisting of $BaTiO_3$, SBN, GaAs, and $Bi_{12}SiO_{20}$.

11. A photorefractive spatial light modulator, comprising:
    means for receiving an input beam of incoherent light bearing an image having an input intensity pattern;
    a photorefractive medium;
    a translating optical grating external to said photorefractive medium;
    means for directing said input beam through said translating optical grating and into said photorefractive medium to generate a holographic grating;
    means for directing a coherent beam of light into said holographic grating; and
    said photorefractive medium generating an output beam of coherent light bearing the image, said output beam produced by interaction of said coherent beam with said holographic grating and having an output intensity pattern proportional to the square of said input intensity pattern.

12. The photorefractive spatial light modulator of claim 11, further comprising means for applying an electric field to said photorefractive medium.

13. The photorefractive spatial light modulator of claim 12, wherein said translating optical grating has a velocity selected to optimize a diffraction efficiency of said holographic grating.

14. The photorefractive spatial light modulator of claim 13, wherein said photorefractive medium comprises a crystal of material selected from the group of photorefractive materials consisting of GaAs and $Bi_{12}SiO_{20}$.

15. The photorefractive spatial light modulator of claim 14, wherein said crystal of $Bi_{12}SiO_{20}$ has a thickness of about 1 mm to 1 cm, said translating optical grating has a period of about 20 to 70 $\mu$m and a velocity of about 2 to 20 $\mu$m/second, and said applied electric field is approximately 5 kV/cm.

16. A method of converting an image from an incoherent input beam to a coherent output beam, comprising the steps of:
    receiving an input beam of incoherent light bearing the image having an input intensity pattern;
    providing a photorefractive medium;
    providing a translating optical grating external to said photorefractive medium;
    directing said input beam through said translating optical grating and into said photorefractive medium to generate a holographic grating;
    directing a coherent beam of light into said holographic grating; and
    generating an output beam of coherent light bearing the image, said output beam produced by interaction of said coherent beam with said holographic grating and having an output intensity pattern proportional to the square of said input intensity pattern.

17. The method of claim 16, further comprising the step of applying an electric field to said photorefractive medium.

18. The method of claim 17, further comprising the step of selecting a velocity of said translating optical grating to optimize a diffraction efficiency of said holographic grating.

19. The method of claim 18, wherein the step of providing a photorefractive medium comprises providing a crystal of material selected from the group of photorefractive materials consisting of GaAs and $Bi_{12}SiO_{20}$.

20. The method of claim 19, further comprising the steps of:

providing said crystal of $Bi_{12}SiO_{20}$ or GaAs with a thickness of about 1 mm to 1 cm;
providing said external grating with a period of about 20 to 70 $\mu$m;

translating said external grating at a velocity of about 2 to 20 $\mu$m/second; and
applying said electric field at approximately 5 kV/cm.

* * * * *